Jan. 17, 1967    K. J. HARRIS ETAL    3,298,252
TRANSMISSION
Filed Jan. 17, 1964    5 Sheets-Sheet 1

| UNITS ENGAGED | | | | | | | |
|---|---|---|---|---|---|---|---|
| SPEED | C3 | B4 | B3 | B2 | B1 | C2 | C1 |
| N. |   |   |   |   | X |   |   |
| N. FWD. | X |   |   |   | X |   |   |
| 1 | X |   |   |   | X |   | X |
| 2 | X |   |   | X |   |   | X |
| 3 | X |   |   |   | X | X |   |
| 4 | X |   |   | X |   | X |   |
| 5 |   | X |   |   | X | X |   |
| 6 |   | X |   | X |   | X |   |
| 7 | X |   |   |   |   | X | X |
| 8 |   | X |   |   |   | X | X |
| N. REV. |   |   | X |   | X |   |   |
| 1 |   |   | X |   | X |   | X |
| 2 |   |   | X | X |   |   | X |
| 3 |   |   | X |   | X | X |   |
| 4 |   |   | X | X |   | X |   |

FIG. 3

INVENTORS
K. J. HARRIS
R. J. MEYER
D. I. MALM

INVENTORS
K. J. HARRIS
R. J. MEYER
D. I. MALM

United States Patent Office 3,298,252
Patented Jan. 17, 1967

3,298,252
TRANSMISSION
Kenneth J. Harris, Raymond J. Meyer, and Donald I. Malm, Waterloo, Iowa, assignors to Deere & Company, Moline, Ill., a corporation of Delaware
Filed Jan. 17, 1964, Ser. No. 338,339
9 Claims. (Cl. 74—761)

This invention relates to a transmission and more particularly to a planetary transmission and its controls.

The invention finds particular utility in vehicles of the agricultural and/or industrial tractor type, wherein experience has shown that certain speeds and speed-change increments are desirable to suit a variety of working conditions. Vehicles of the tractor type differ from automotive vehicles such as pleasure cars primarily in the use in the former of governed engines, thus providing a relatively constant engine speed so that ground speeds of different ratios must be obtained by shifting gears or their equivalents. A tractor transmission that provides a variety of definite forward speeds has certain advantages over a transmission that is automatically or infinitely variable, but also has inherent disadvantages presented by up-shifting and down-shifting, particularly the latter, since down shifts must occur without an appreciable disconnection between the driving torque and the load. For example, in plowing with a tractor, a temporary increase in load can be overcome by shifting down from, say, third to second, but if the shift interval is too long, the tractor loses momentum and thus requires a further down-shift before it can proceed. It is therefore one of the objects of the present invention to provide a transmission having carefully selected intervals between speeds as well as improved means for minimizing the time required to effect speed changes.

Another object is to provide a transmission which has the most desirable basic speeds plus certain auxiliary speeds. For example, the six basic speeds are (in m.p.h.): 1½ and 2½ for power shaft work; 3½ and 4½ for tillage; 7 to 8 for mowing and other haying operations; and around 20 for high transport speed. At least one reverse speed of approximately 3½ m.p.h. is also required. In association with this, it is found that in order to achieve smooth shifting and still retain sufficient speed change to increase the drawbar pull enough to overcome temporary increases in load, about a 25% reduction in speed between steps is most desirable. The transmission provided according to the present invention adequately accomplishes this object.

An industrial tractor has many operations characterized by what is known as "shuttling," which means rapid changes in direction between forward and reverse at approximately the same speeds, typically 3½ m.p.h. The present transmission enables the achievement of such shuttling.

It is another object of the invention to accomplish the foregoing results with a minimum number of clutch and brake elements, not only as an entirety but also as respects the number of these elements that are engaging and disengaging at the same time. This is involved with improvements in changing between engaging and disengaging in relatively short periods of time; e.g., .2 to .5 second, which prevents the dropping of the tractor load during shifts.

It is a further object of the invention to provide an improved planetary transmission in which many of the elements are adapted to float on others, whereby it is possible to use larger manufacturing tolerances and also to eliminate unnecessary bearings.

Bearing in mind that the present transmission provides 8 forward speeds and 4 reverse speeds, it is another object to provide simple shifting means, together with a shift pattern incorporating a simple fore-and-aft lever movement with a short crossover between the two paths for forward and reverse speeds. Combined with this is the feature that a clutch pedal as such is not necessary for normal operation but is available for inching and emergency stops.

The transmission further incorporates a disconnection between the transmission and the final drive so as to enable the tractor to be pushed or towed, thus avoiding damage to the transmission because of the fact that the lubrication pump is not running unless the engine is running.

It is an important object of the invention to provide a compact transmission in which the components are arranged primarily in fore-and-aft alinement, the planetary pack being preceded by a triple clutch pack and followed by the final drive. The triple clutch pack includes first and second clutches for controlling first and second input sun gears for the planetary pack, while the third clutch is used for the control of a power shaft leading to the power take-off shaft or shafts of the tractor. The planetary gearing itself features the aforesaid dual-sun input to two simple planetaries which are compounded by the use of planetary spool pinions. The ring gears of this planetary are selectively controlled so that the carrier thereof becomes the input for the second section of the planetary which is another planetary system incorporating direct drive, overdrive and reverse. The first and second clutches are alternately and selectively engageable to produce, in conjunction with the alternate and selective engagement and disengagement of the ring gears, four reduction speeds for the carrier. Both of these clutches can be simultaneously engaged to lock up the front planetary, thereby adding a fifth speed. This, in conjunction with the three-speed rear planetary section, actually affords 15 speeds, of which only 12 are used in the present case; namely, 8 forward speeds and 4 reverse speeds. These 12 speeds satisfy the basic requirement for an agricultural or industrial tractor and the other 3 speeds are not required, since they would fall between the desirable speed-change increments previously described in general.

The invention further features hydraulic control contributing to the smooth and rapid shiftability of the transmission, in which connection it is a feature of the invention that a minimum number of valves are used, together with an accumulator which serves also as a sequencing means for the system. Basically, pilot valves are used and these are associated with a main control valve which in turn is controlled by a single shift lever; although, two levers may be provided in industrial tractors, one for forward speeds and the other for changing rapidly between forward and reverse. This phase of the invention features safety interlock means among the linkage and valves so that accidental shifting into undesired speed conditions is prevented. The control linkage also incorporates the control of a parking lock for the tractor, together with means for assuring certain conditions of the parking lock according to changes in position of the single shift control lever.

As regards the hydraulic control, the invention exploits a simple feed-back type of circuit in which the disengaging clutches are dumped to reservoir only after the engaging clutches have reached a specified degree of engagement.

The foregoing and other important objects and desirable features inherent in and encompassed by the invention will become apparent as a preferred embodiment thereof is disclosed in detail, by way of example, in the ensuing description and accompanying sheets of drawings, the several figures of which will be described below.

3

Figure 1:
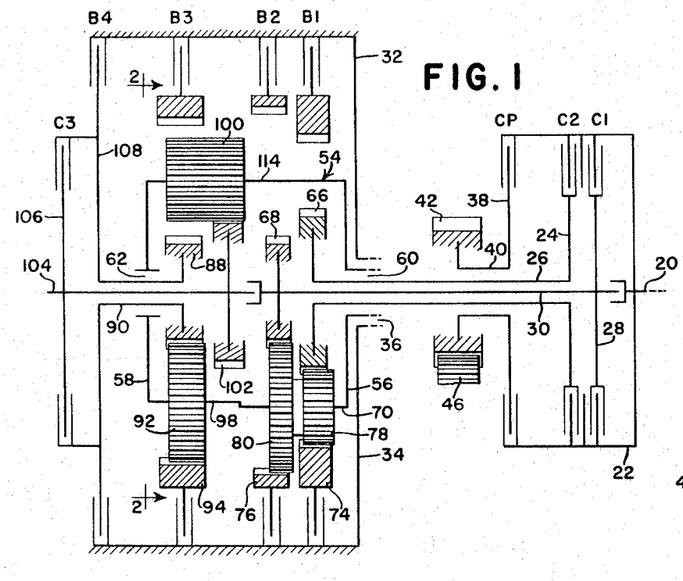
FIG. 1 is a diagrammatic view, partly in section, of the basic transmission.
Figure 2:
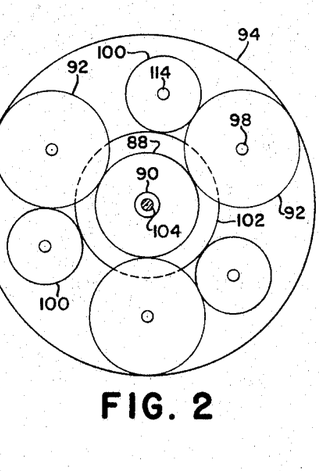
FIG. 2 is a schematic view as seen generally along the line 2—2 of FIG. 1.
Figure 3:
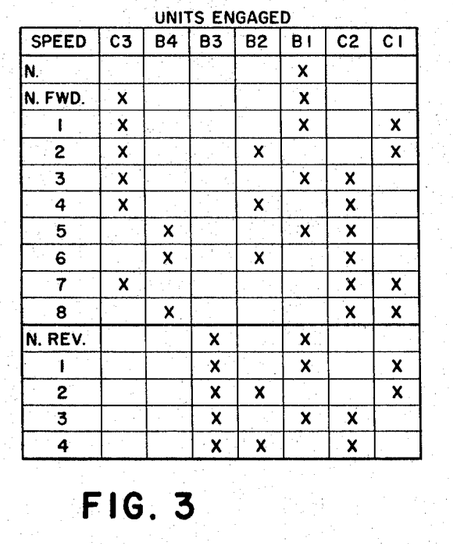
FIG. 3 is a table showing the relationship among the forward and reverse speeds and the clutch and brake units engageable and disengageable to achieve those speeds.

The basic transmission can best be understood from FIGS. 1, 2 and 3, wherein 20 represents a drive shaft driven from an internal combustion engine. This shaft is keyed to a clutch drum 22 which includes three clutches of the multiplate type C1, C2 and CP. Clutch C2 incorporates a driven plate 24 coaxially keyed to a rearwardly extending hollow input shaft 26. The expression "rearwardly" is used on the basis of a typical fore-and-aft disposition of the transmission in the tractor. However, it will be realized that such expressions are used for purposes of convenience and not by way of limitation.

The clutch C1 has a driven clutch plate 28 coaxially keyed to a second input shaft 30 which passes coaxially loosely through the input shaft 26. The numeral 32 represents the transmission housing, casing or frame of the tractor or equivalent vehicle. The three clutches C1, C2 and CP constitute what may be regarded as a triple-clutch pack disposed forwardly of the housing structure 32 and the forward wall 34 of the housing is centrally apertured at 36 to accommodate the input shafts 26 and 30.

Figure 4:
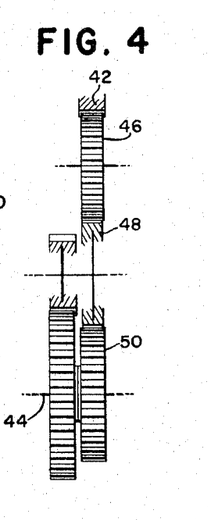
FIG. 4 is a schematic view, partly in section and drawn to a reduced scale as respects FIG. 1, of a power train for the power take-off shaft of the tractor.

The clutch CP has a driven clutch plate 38 which is coaxially connected to a tubular power shaft 40 which in turn has keyed thereto a power shaft gear 42. The tubular power shaft 40 loosely encircles the first input shaft 26, and the gear 42 is interposed axially intermediate the triple-clutch pack and the housing 32. A train of gears leading to a power take-off shaft 44 (FIG. 4) is driven by the gear 42. This train comprises a first gear 46, an intermediate double gear 48 and an ultimate double gear 50, the latter being associated with the power shaft 44. Not material here is the fact that the power shaft 44 may be selectively connectible to and disconnectible from the double gear 50. Likewise, the shaft 44 may extend both forwardly and rearwardly so as to give the tractor front and rear power take-off shafts. The relationship among the gear 42 and the gear train 46-48-50 may be easily seen in FIG. 4 by a comparison with FIG. 1, since a portion of the gear 46 is repeated in FIG. 1 and a portion of the power shaft gear 42 is repeated in FIG. 4. As already noted, FIG. 4 is drawn to a reduced scale as respects FIG. 1.

Figures 5, 6:
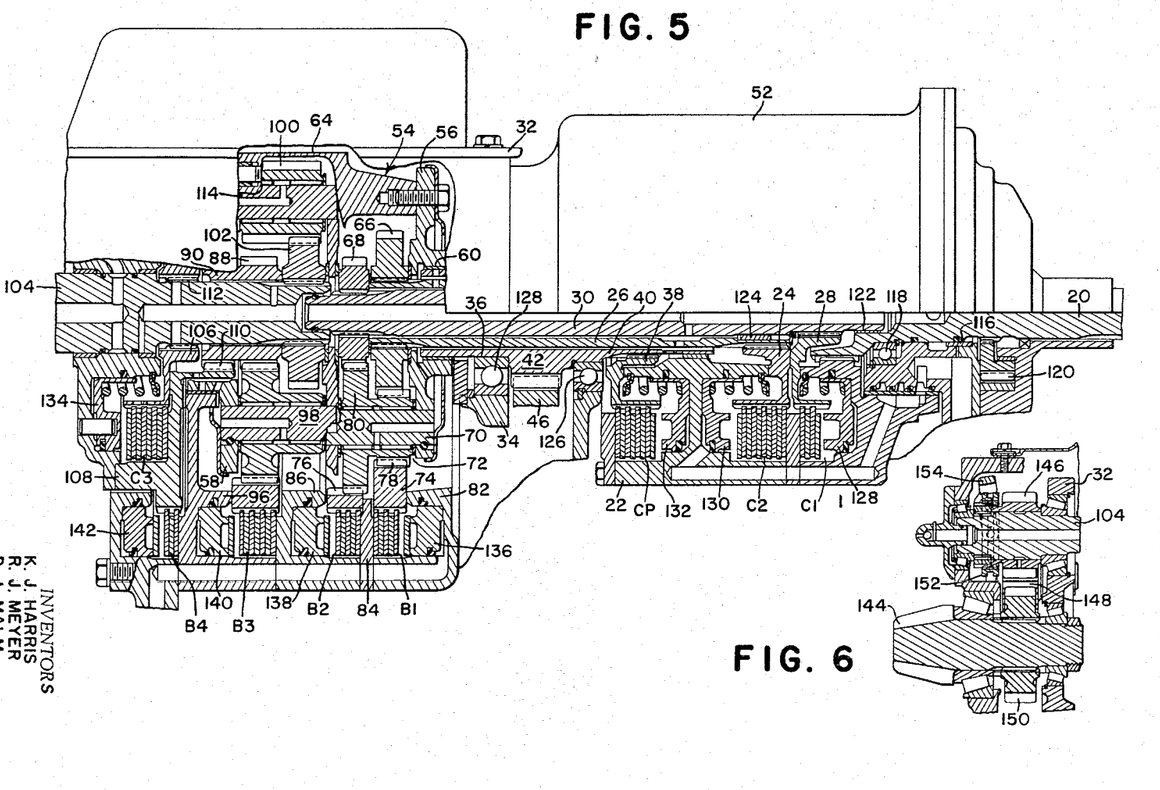
FIG. 5 is a longitudinal sectional view, partly in elevation, of the transmission as embodied in a commercial design, the driving components, however, having the same respective diameters as their counterparts in FIG. 1, FIG. 1 being telescoped fore and aft to conserve space.
FIG. 6 is a fragmentary sectional view, on a scale reduced as respects that of FIG. 5, showing the connection of the transmission to the final drive train that leads to the bevel pinion which drives the tractor rear axles.

As seen in FIG. 5, the power gear 42 will be enclosed in a portion of a clutch housing 52.

One of the basic components of the planetary gearing is the use of a single carrier 54. This carrier is relatively short in fore-and-aft extent and has front and rear walls 56 and 58, respectively, coaxially apertured at 60 and 62, respectively. The carrier has means rigidly interconnecting the front and rear walls 56 and 58 and this means in the present case is made up of a several shafts, for carrying planet gears to be hereinafter described, together with circumferentially spaced wall portions, one of which appears at 64 in FIG. 5. As will be described later, appropriate bearings are used among the several rotating parts. For the present, the occurrence of these bearings will be assumed in FIG. 1.

The hollow input shaft 26 of course extends coaxially through the front wall carrier opening 60 and has keyed or otherwise affixed thereto within the carrier a first sun gear 66 just rearwardly of the carrier front wall 56. The second input shaft 30 extends through the hollow input shaft 26 and has affixed thereto, just rearwardly of the first sun gear 66, a second smaller sun gear 68. The carrier is provided typically with three planet pinion shafts, only one of which is shown at 70, for purposes of simplification of the disclosure. This shaft 70 constitutes part of the means rigidly interconnecting the front and rear walls of the carrier and these shafts of course will be angularly spaced relative to such portions as the portion 64 so that the carrier will have openings therein, as at 72 in FIG. 5, through which the planet pinions may be exposed radially outwardly for meshing with first and second ring gears 74 and 76, respectively. The double-spool planet pinion here comprises a first planet gear 78 and a coaxially connected larger second planet gear 80. Likewise, the first ring gear 74 has a smaller inside diameter than does the second ring gear 76. The ring gears concentrically encircle the sun gears 66 and 68 respectively and are floatingly carried respectively by the pinion or planet gears 78 and 80. The casing 32 is provided with three projecting portions 82, 84 and 86 which are spaced apart fore-and-aft to accommodate the ring gears 74 and 76 and to confine these ring gears against excessive axial shifting (FIG. 5).

From the description thus far, and noting that the drive shaft 20 may be connected to a power source such as an internal combustion engine, by a clutch or other torque-transmitting mechanism, it will be seen that the drive shaft may be regarded as a constantly rotating part, which of course constantly rotates the clutch drum 22. If only the clutch C1 is engaged, the sun gear 68 will be driven at the speed of drive shaft 20. If the ring gear 74 is now held, it will serve as a reaction element and the carrier 54 will be driven at a reduction speed ratio but in the same direction as the shaft 20. For purposes of holding the ring gear 74, a disk or plate brake B1 is provided between the ring gear and the transmission housing 32. If, while clutch C1 is still engaged, brake B1 is released and the second ring gear 76 is held, a different but higher reduction ratio will be afforded by which the carrier 54 will be driven. Such second brake is a plate or disk brake B2 between the housing 32 and the ring gear 76. If clutch C2, rather than clutch C1, is engaged and the brakes B1 and B2 alternately engaged and released, two additional speed ratios will be afforded for driving the carrier 54. Thus, the front portion of the planetary transmission, including the sun gears 66 and 68, the ring gears 74 and 76 and the planet pinions 78 and 80, together with clutches C1 and C2, become a first planetary unit in which the output member is the carrier 54.

A fifth speed is provided when both clutches C1, C2 are engaged and both brakes B1, B2 are released. This will be a direct drive, because the planetary system, to the extent described, will be locked up and the carrier 54 will rotate at the speed of the drive shaft 20.

From the foregoing it is noted that five speeds are available in the front unit or section of the planetary gearing and it remains only to provide additional speeds, for which the carrier 54 is the input member, in a rear section. Characteristic of the planetary design disclosed here is the use of the single carrier 54 in both planetary units, together with planetary units, together with planet gears and additional sun gears to be presently described.

Coaxially just forwardly of the carrier rear wall 58 is a third sun gear 88 which is coaxially keyed to a hollow intermediate shaft 90 that extends rearwardly through the opening 62 in the carrier rear wall 58. A third planet gear 92 meshes with the third sun gear 88 as well as with a third ring gear 94 which is concentric with the sun gear 88 and in encircling relationship to the carrier 54. This ring gear is also floatingly carried, being confined against axial shifting between the housing projecting portion 86 and a similar portion 96 (FIG. 5), the floating mounting occurring because of the encircling of the planet gears 92 by the ring gear, it being understood that here again the planet gears 92 are provided in a set of three, 120° apart as is conventional.

The planet gear 92 is journaled on a further shaft 98 which is radially offset from the gear shaft 70 that carries the double spool planet gear 78-80, but again the shaft 98 serves as part of the means that cross-connects the front and rear portions of the carrier.

The ring gear 94 may be selectively braked or released by means of brake means B3 cooperative between the ring gear and the housing 32. Here again, the brake B3 may be of the multi-plate or disk type. The use of the planet gears 92 in a set of three is shown FIG. 2, which also shows that each of the planet gears 92 is in constant mesh with a fourth planet gear 100, which is a wide gear so as to mesh also with a fourth sun gear 102 coaxially interposed between the second sun gear 68 and the third gear 88. It will be seen that the planet gears 100 do not mesh with the ring gear 94. The sun gear 102 is coaxially fixedly connected to a rearwardly extending output shaft 104 which projects through the tubular intermediate shaft 90 and which has affixed thereto a clutch plate 106 which forms part of a third clutch C3 connectible and disconnectible between output shaft 104 and the intermediate shaft 90, the latter having a driving part 108 thereon between which and the plate 106 the clutch C3 is effected. As seen in FIG. 5, the connection between the intermediate shaft 90 and the plate 108 is effected by a spline at 110, and the similar connection between the output shaft 104 and the plate 106 occurs because of a spline 112. The plate 108 is peripherally extended so that its marginal portions are utilized with portions carried by the housing 32 to afford a fourth brake B4.

Now, and considering the carrier 54 as the input for the rear planetary section comprising the sun gears 88 and 102, the planet gears 92 and 100, the ring gear 94 and the brakes B3 and B4 and clutch C3, this portion of the planetary gearing provides direct drive, forward overdrive and reverse reduction. This because the carrier 54, being the input, while the ring 94 is held, produces reverse, whereas if the third or intermediate sun gear 88 is held via brake B4, the result is forward overdrive, the sun gear 88 serving as a reaction member in this case, a principle which is readily understood if the sun gear 88 is regarded as being substituted for a conventional ring gear, which of course requires the interposition of the wide planet gear 100 so that forward rather than reverse is obtained. Direct drive is obtained when the rear planetary section is locked up by engagement of clutch C3.

It will appear from the foregoing that the forward portion of the transmission provides 5 speeds forward and that the rear portion provides 2 additional forward speeds plus 1 reverse speed. As pointed out previously, 12 of these 15 speeds are all that are required to satisfy the basic requirements in commercially acceptable agricultural and industrial tractors; although, this does not exclude the possibility of exploiting the 3 additional speeds.

To complete the general description of the structure, the planet pinions 100 are carried respectively on carrier shafts 114.

The selected 8 speeds forward and 4 speeds in reverse are illustrated in FIG. 3. The lowest reduction forward is of course the combination of C1, B1 and C3, since C1 and B1 produce low-low in the front section and C3 produces direct in the rear section. A change from B1 to B2, leaving C1 and C3 engaged, produces second speed forward, which is in effect low-high in the front section and direct in the rear section. Third speed forward involves a change from C1 to C2 and B2 back to B1 while leaving C3 engaged, which is in effect high-low in the front section and direct in the rear. Fourth speed forward is, like second speed, a change between B1 and B2, but here C2 is left engaged, as is C3, which is in effect high-high in the front section and direct in the rear section.

As respects the first four speeds forward, the interchange is only between C1 and C2 and B1 and B2, C3 (direct drive in the rear section) being always engaged. It is not until fifth speed forward that overdrive is employed, and this fifth speed forward is an overdrive of third speed forward. Likewise, sixth speed is an overdrive of fourth speed forward.

In seventh speed, both clutches C1 and C2 are engaged, brakes B1 and B2 are disengaged and clutch C3 is engaged. This provides direct drive straight through. With clutches C1 and C2 remaining engaged, the change is made between clutch C3 and brake B4, thus giving eighth speed forward as an overdrive of seventh.

It is characteristic of this transmission that a minimum number of brakes and/or clutches are engaged and disengaged between speed changes. For example, in the change from first to second forward, the only change occurs between brakes B1 and B2. This is also true in the down shift from second to first. In the change between second and third (or third and second) only four units are changed; namely, B2 and B1 and C1 and C2. In the change between third and fourth (or fourth and third) only two units are changed; namely, B1 and B2. In other words, one may alternate between third and fourth just as the alternation occurs between first and second.

In the change between fourth and fifth, four units are changed; namely, B2 and B1 and C3 and B4. Between fifth and sixth, two units are changed, which are B1 and B2. Sixth speed forward, and overdrive speed like fifth speed forward, occurs because of an upshift in the front planetary section.

In seventh speed forward, which is straight-through direct drive, three units are changed or affected. The change is made between B4 and C3 (two units) and clutch C1 additionally is engaged (a third unit). Only two units are changed in eighth speed forward, which is an overdrive of seventh; namely, C3 and B4. The reduction in number of units (brakes and/or clutches) that are changed between speeds means also a reduction in the time interval, and consequently speed changes may be effected more rapidly and smoothly.

The four reverse speeds are respectively similar to the first forward speeds, which will be readily seen from the chart. The basic distinction is, of course, that reversing brake B3 is employed in all reverse speeds, whereas this brake is of course not employed in any of the forward speeds. Likewise, clutch C3 and brake B4 are not used in reverse. The respective numbers of units that are changed among the 4 reverse speeds will be readily seen from the table.

A brief explanation of the reductions in the front planetary section may be in order. For example, when clutch C1 is engaged, the reduction occurs between sun gear 68, planet gear 80–78 and ring gear 74. In the case of engagement of clutch C2 (third speed forward, for example) the reduction is among sun gear 66, planet gear 78 and ring gear 74, it being noted that the sun gear 66 is larger than the sun gear 68. The foregoing will explain other reductions obtainable in the first planetary section.

Reference will now be had to FIG. 5 for completion of the structural aspects of the mechanism. As will be seen there, the main or drive shaft 20 is journaled in the clutch casing 52 by bearings at 116 and 118 and that this shaft further drives a hydraulic pump 120, used for supplying fluid under pressure to the clutches and brakes. The forward end of the input shaft 30 is piloted at 122 in the rear end of the shaft 20 and its rear end, carried by the sun gear 68, is piloted in the forward end of the output shaft 104, and the sun gear 68 is floated by the planet gears 80. A bearing 124 carries the forward end of the shaft 26 on the shaft 30, and the rear end of the shaft 26 is carried by the sun gear 66 which floats on the planet gears 78. The power shaft 40 is carried by bearings 126 and 128 in the housing 32. Journaling of the carrier 54 has already been described or will be clear from the drawings.

The clutches C1, C2, CP and C3 are of the spring-disengage and pressure-engage type. For example, the clutch C1 has a piston 128, the clutch C2 has a piston 130, the clutch CP has a piston 132 and clutch C3 has its piston at 134. These pistons are appropriately connected to the source of fluid under pressure (including the pump 120) by a hydraulic circuit to be described. The various passages leading to the respective pistons, shown in FIG. 5, need not be described. The brakes B1, B2, B3 and B4 have pressure-operated pistons 136, 138, 140 and 142 respectively. The details of the hydraulic control will be described subsequently in connection with FIGS. 7 and 8.

FIG. 6 shows on a reduced scale the connection of the output shaft 104 to a final drive bevel pinion 144 through the intermediary of a spur gear 146, journaled on the output shaft 104, an intervening idler 148 and a gear 150 keyed to the shaft on which the bevel pinion 144 is formed. When the transmission is in driving condition, the gear 146 is connected to the output shaft 104 by a shifting collar 152 which is splined to the shaft and which has a toothed or splined connection to the gear 146 when shifted forwardly as seen in FIG. 6. Any conventional throwout means, such as that shown at 154, may be utilized to shift the collar 152 back and forth. The purpose of providing a disconnection in this area is to disconnect the transmission from the final drive so that the tractor may be towed or pushed, which prevents damage to the transmission because occasions in which the tractor must be towed or pushed ordinarily entail conditions in which the engine is not running. Since the pump is driven from the engine, it will not run unless the engine does and therefore lubrication to the transmission will not be supplied. With the disconnection effected at 152–146, the parts of the transmission will not turn when the tractor is towed or pushed.

Figures 7, 8:
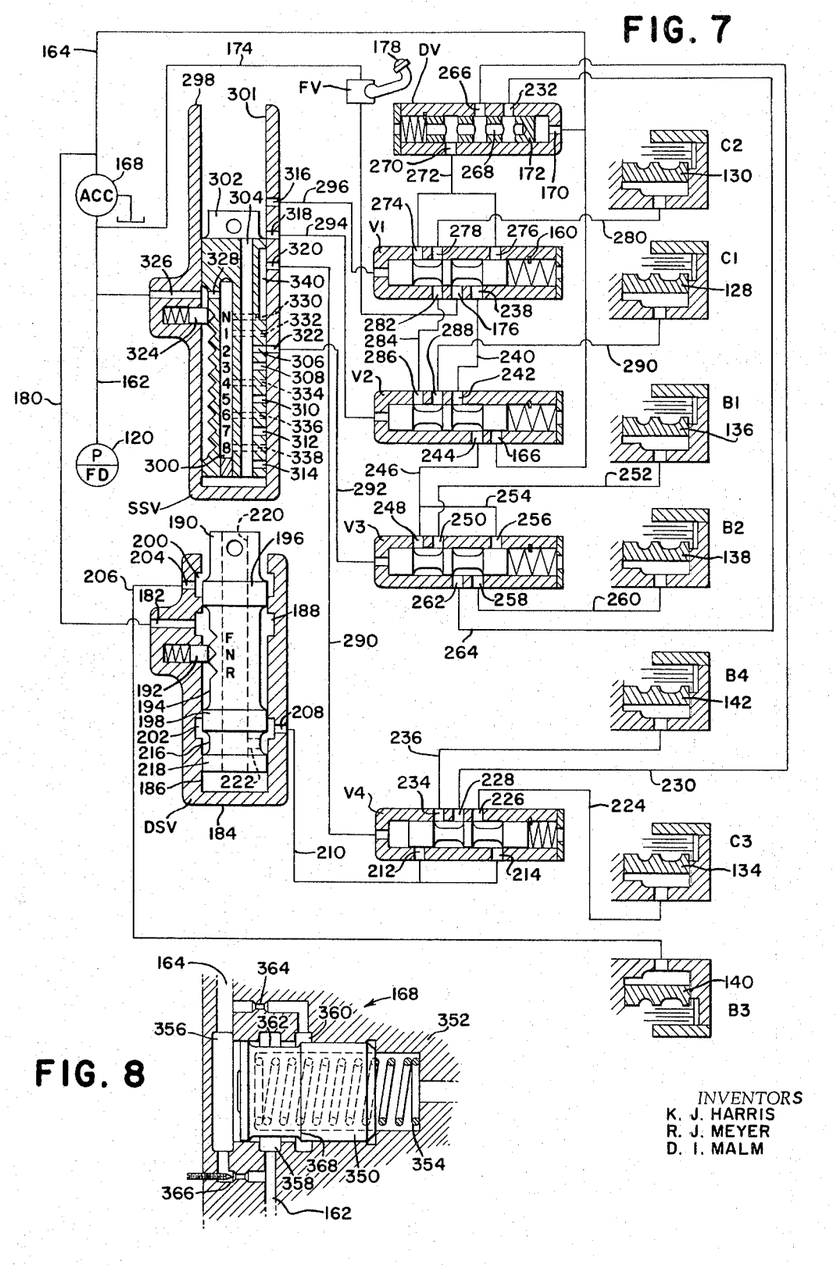
FIG. 7 is a schematic or diagrammatic view, partly in section, illustarting the hydraulic control circuit.
FIG. 8 is an enlarged view, largely in section, of the accumulator in the hydraulic circuit.

It will be apparent from the foregoing description that the transmission comprises a front section including the clutches and brakes C1, C2, B1 and B2, and a rear section comprising the clutch C3 and brakes B3 and B4. The various clutches and brakes are of course friction devices acting on the respective planetary gearings and, since these are hydraulically operated, the respective pistons 128, 130, 136, 138, 140, 142 and 134 may be regarded as fluid-pressure actuators, selectively chargeable and dischargeable to engage and disengage the respective friction device. All these devices are of the type that are biased to disengaged positions. In the cases of the clutches, coil springs are shown. In the cases of the brakes, spring washers (not shown) may be used to return the brake pistons to disengaged positions. These are well-known expedients and need not be elaborated. The fluid passages in FIG. 5 are visible to some extent but need not be described in detail, since the entire circuit is shown in FIG. 7. So far as that figure is concerned, the sheet itself may be regarded as a reservoir or sump, recognizing of course that in the actual tractor the transmission housing or some other appropriate housing would serve as the sump. The several friction devices and their associated actuators are shown schematically along the right-hand side of the sheet and the fluid-pressure and return lines are shown throughout as single lines. In addition to the actuators, which will be designated by the respective reference numerals given to the pistons (e.g., 128 etc.), portions of the friction devices are shown. It will be clear that each actuator of course includes the cylinder in the friction device housing in which the respective piston moves.

The circuit includes the aforesaid actuators, supplied by the pump 120 and controlled by 4 pilot-operated valves V1, V2, V3 and V4, together with a speed selector pilot valve SSV, direction selector valve DSV, a dump valve DV and a foot valve FV. The control valves V1, V2, V3 and V4 are identical and only a brief description of each will be required, recognizing that the elimination of excess reference numerals will be in the interests of clarity. As will be seen, each valve includes a housing within which a piston is movable back and forth, biased in one direction by a coil spring and movable against the bias by pilot pressure introduced to a port at the left-hand end of the housing. The amount of movement of each valve is controlled by any suitable stop, as at 160 for the valve V1. Similar stops will be recognized in the other valves as well as in the dump valve DV. The piston in each of the valves V1, V2, V3 and V4 comprises a pair of annular grooves separated by a central land and further established by opposite end lands which require no separate reference numeral designation. Since these valves differ as to porting, the ports will be separately described.

Leading from the pump 120 is a pressure line 162 which continues beyond the speed selector valve SSV as a line 164 that leads ultimately to a port 166 in valve V2, which in its neutral position is biased to the left as shown in FIG. 7. Impressed upon the line 164 is accumulator pressure established by an accumulator 168, shown by itself in FIG. 8. A branch of the line 164 leads to the end port 170 of the dump valve DV, so that pressure in the line will tend to move the dump valve piston 172 to the left against the spring.

A second pressure line 174 is connected to the pressure line 162 upstream of the accumulator 168, thus by-passing the accumulator, and leading to the foot valve FV and thence to a port 176 in valve V1. The foot valve is of the conventional type which is normally open to continue the line 174 but which when shifted dumps the line 174 to sump. This is accomplished by a pedal 178 which may be the usual clutch pedal on the vehicle. The purposes of the valve will be described in more detail subsequently.

Another branch of the pressure line 162 leads at 180 to an inlet 182 in the housing 184 of the direction selector valve DSV. The port 182 leads to the bore 186 of this valve via an annular groove 188. A valve spool 190 is selectively shiftable among three positions, herein designated F, N and R, standing respectively for "forward," "neutral" and "reverse." In FIG. 7, the spool 190 is shown in its neutral position. A detent 192 typically retains the spool in any one of its three selected positions. The spool has a central reduced portion 194 flanked respectively by upper and lower lands 196 and 198 operating respectively in conjunction with annular grooves 200 and 202 in the valve housing 184. A port 204 in the housing of the valve DSV is connected by a line 206 to the actuator 140 for the reverse brake B3. A port 208 leads from the lower groove 202 via a line 210 to two ports 212 and 214 in the pilot-operated valve V4. The spool of the direction selector valve DSV further has an annular groove 216 below the land 198 and bordered by a third land 218. A central bore 220 in the spool 190 leads to sump and communicates via a short radial passage 222 with the valve housing groove 202. In the neutral position of the spool valve for the direction selector valve DSV as shown in FIG. 7, no pressure reaches either of the ports 204 or 208, both of which are connected to sump via the respective housing grooves 200 and 202, the latter via the passage 222 and spool bore 220. Thus, there is no pressure in either of the actuators C3 or B3, the former returning to sump via a line 224, a port 226 and valve V4 and across the groove in the piston of valve V4 to the port 214 and thence via the line 210 to the direction selector valve DSV. The housing of the valve V4 further has another port 228 which leads via a line 230 to a port 232 in the dump valve DV. Another port 234 in the valve V4 leads via a line 236 to the actuator 142 for brake B4.

As previously described, the foot valve pressure line 174 leads to the port 176 in valve V1. From there, via another port 238, the pressure is conducted by a line 240 to a port 242 in valve V2, thence across the groove in that piston and out a port 244 via a line 246 to a port 248 in valve V3. The piston in that valve uncovers a second port 250 for connection via a line 252 to the actuator 136 for brake B1. A branch line 254 from line 246 leads to a third upper port 256 in valve V3. A fourth port 258 leads from valve V3 via a line 260 to the actuator 138 for brake B2; and a fifth port 262 leads to the dump valve by means of a line 264 and a second port 266 in the dump valve. Since the dump valve piston 172 is pressurized to the left in FIG. 7, it leads to sump, having a central bore 268 and a plurality of cross-passages, two of which are in register with the dump valve ports 232 and 266 and the third of which is in register with a third dump valve port 270 which in turn leads by a branched line 272 to ports 274 and 276 in valve V1. Another port 278 in valve V1 leads via a line 280 to the actuator 130 for clutch C2, from which it will be seen that this clutch is dumped to sump in the neutral condition of the transmission.

Valve V1 has a further port 282 which is connected by a line 284 to a port 286 in valve V2, which port, because of the position of the piston in valve V2, is in communication with another port 288 connected by a line 290a to the actuator 128 for clutch C1, whereby this clutch is also dumped to sump via the dump valve.

The three valves V1, V2 and V3, being pilot operated and in neutral positions when unpressurized, are of course biased to the left by their respective springs. Valve V4 is subjected to pilot pressure via a line 290 so that it has moved to the right against its stop, establishing the communications and blockades as illustrated. The pilot line 290, like pilot lines 292, 294 and 296 for the other valves V3, V2 and V1, respectively, lead from ports in the valve housing 298 of the speed selector valve SSV. This housing has a valve bore 301 in which a valve spool or member 302 is slidable among several positions to be described in detail later. An elongated passage 304 through the valve member 302 leads to sump, having several radial passages 306, 308, 310, 312 and 314, at times selectively registrable with ports 316, 318, 320 and 322 in the speed selector valve housing 298. As will be seen, the port 316 leads to the pilot line 296, and similar connections are supplied among the port 318 and pilot line 294, port 320 and pilot line 290 and port 322 and pilot line 292.

The valve member 302 of the speed selector valve SSV is detented for positioning among neutral and eight speed positions, here numbered 1–8, a typical detent being used as at 324. There is, in addition to the nine positions just noted, a tenth or "park" position, which is not material to the present description but which will be dealt with subsequently.

The speed selector valve housing 298 has an inlet 326 which communicates via a passage 328 with a longitudinal bore 300, parallel to but separate from the sump or return bore 304. The pressure bore 300 has a plurality of cross-passages leading to ports 330, 332, 334, 336 and 338. The port 330 is elongated, as at 340. Thus, in the neutral position of the speed selector valve SSV, the pilot line 290 is pressurized via the pressure bore 300, crosspassage 330, long passage 340 and port 320. The remaining ports are blocked. As already noted, the pilot lines 292, 294 and 296 from the pilot operated valves V3, V2 and V1 are conducted to sump. Therefore, in the neutral condition of the transmission and regarding the foot valve FV as open, the only actuator that is charged or pressurized is actuator 136 for brake B1. However, this will not establish a drive through the transmission, since neither the clutch C3 nor either of the brakes B3 or B4 is engaged, their respective actuators being discharged to sump. For example, the actuator 140 for brake B3 is directed to sump via line 206, port 204 and groove 200 in the direction selector valve DSV. Actuator 134 for clutch C3 is discharged to sump via line 224, ports 226 and 214 in valve V4 and line 210, which leads to port 208 and groove 202 and thence via passages 222 and 220 in the direction selector valve DSV. Actuator 142 for brake B4 is directed to sump via the dump valve DV, the line 236 from the actuator 140 leading through ports 234 and 228 of valve V4 to the port 266 of the dump valve. The other actuators 130, 128 and 138 are likewise directed to the dump valve through the several valves V1, V2 and V3.

The first phase in establishing drive through the transmission requires a selection of direction, which is accomplished by the direction selector valve DSV. If the desired direction is forward, the valve spool 190 is moved downwardly to engage the "F" notch with the detent 192. This leaves the reverse brake still connected to sump via line 206, but the forward line 210 is pressurized, since the long groove 194 on spool 190 connects the two valve housing grooves 188 and 202. Valve V4 is already under pilot pressure via line 290 from the neutrally positioned speed selector valve SSV, so that line 210 leads via ports 214 and 226 in the valve V4 to the actuator 134 for the clutch C3, thus engaging this clutch.

There is still no drive in the transmission, since it requires in the forward section any one of four combinations of two actuators to be charged or pressurized. This will be seen from the table in FIG. 3, the four combinations being C1–B1, C1–B2, C2–B1 and C2–B2. A fifth combination is available when both clutches C1 and C2 are engaged, as in seventh and eighth speeds. However, considering only the four clutch-brake combinations, it will be seen that the result is driving of the carrier or intermediate element 54 at any one of four forward speeds which are utilized via selective or alternate engagement of clutches C3 and B4 to obtain different output speeds at the shaft 104. For the present purposes and considering only first through fourth forward, it will be seen that in all of these clutch C3 is engaged. From this, it follows that pilot line 290 must be pressurized to keep valve V4 in the position shown in FIG. 7 so that pressure is supplied to actuator 134 for clutch C3 via the forward line 210 and V4 valve ports 214 and 226.

It has been established above that with the direction selector valve DSV in forward and the speed selector valve SSV in neutral, only brake B1 and clutch C3 are engaged. It remains therefore to engage one or the other of the clutches C1 or C2. When the speed selector valve is changed to No. 1 position, clutch C1 is engaged, giving a combination of drive established on the clutchbrake combination C1–B1 and rear clutch C3, producing first speed forward, the direction being determined by the direction selector valve DSV, which, as already described, is in forward and will remain in forward position throughout the eight forward speeds of the transmission. Pressurizing of clutch C1 occurs by applying pilot pressure to valve V2 via line 294, shifting the piston of valve V2 to the right. As speed selector valve SSV has its spool 302 moved upwardly, the long passage 340 communicates with pilot line 294 and thus pressurizes that line. Valve V1 is already supplied with actuation pressure through foot valve line 174 and port 176. The piston of valve V1 being to the left, this pressure flows via 238 and 240 to port 242 in valve V2. When the piston in this valve moves to the right, port 242 connects to port 288 and this via line 290 pressurizes clutch C1. Actuator pressure also reaches valve V2 via line 164 and port 166. When the piston in valve V2 shifts to the right via pilot pressure at 294, port 166 connects with port 244, and this leads via line 246 to valve V3 and thence via ports 248 and 250 and line 252 to maintain the charge on actuator 136 for B1. The remaining actuators are discharged to sump.

If it should now be desired to operate the foot valve, this may be done by depressing the pedal 178, thus dumping the line 174 to reservoir. Since the speed selector valve is not changed, the lines leading to clutch C1 will remain as described and consequently these lines will also be dumped to reservoir. Such disengagement of the clutch is desirable in the event of an emergency, or controlled dumping of the line via the foot valve may be resorted to by the operator for "inching" the vehicle. Other than on the two occasions noted, operation of the foot valve FV is not required in shifting the transmission among its several speeds.

A shift from first to second or from second back to first requires only retention of engagement of clutch C1 and alternation of engagement of brakes B1 and B2. This involves a shift of speed selector valve SSV between positions 1 and 2. When the spool of this valve is in position 2, long passage 340 retains its pilot pressure on pilot line 294, as well as on pilot line 290 for valve V4, but adds thereto connection of passage 334 with port 322 and pilot line 292 to valve V3, thus shifting the piston in valve V3 to the right. This not only charges or pressurizes actuator 138 for brake B2 but also discharges or depressurizes actuator 136 for brake B1. Charging of actuator 138 for brake B2 occurs because actuator pressure is supplied via line 164 to the port 166 of valve V2. With the piston of valve V2 to the right, port 166 connects to port 244 and this via line 246 and branch 254 leads to port 256 in valve V3, the piston of which is now to the right so that port 256 connects with port 258 and line 260 to actuator 138 for brake B2. B1 is discharged via line 252 which leads to port 250 in valve V3. With the piston in valve V3 to the right, port 250 connects to port 262 and this in turn leads via line 264 to dump valve port 232. Pilot pressure from line 164 keeps dump valve piston 172 to the left so that the port 232 registers with the interior passage and thence through the bore 268 to sump.

It is at this point that the significance of the dump valve DV appears. Experience has shown that as between two alternately engageable and disengageable friction devices, where the load is dropped by one before it is picked up by the other, the pause in speed becomes so great that the tractor can stop altogether, which is a characteristic peculiar to tractors because of the relatively low speeds at which they are operated, together with the high loads, particularly drawbar loads. This may be stated otherwise as a problem which occurs because of the high ratio of draft requirement to vehicle mass, which causes extremely noticeable and objectionable decelerations during any interval in which power flow to the drive wheels is interrupted. In some instances, the stored energy in the elasticity of the machine is so great that the tractor will be drawn backward if the power interruption exceeds .4 second. To reduce these decelerations to acceptable levels, the engaging and disengaging of clutches and brakes during a shift must be very closely synchronized. Obviously, two friction devices cannot be engaged at the same time, but the present solution relies upon discharging one device only after the engaging or on-coming device has reached a specified degree of engagement. This is accomplished here by the dump valve. When the speed selector valve SSV is changed to its No. 2 position, there occurs in the system a pressure drop because of the requirement of brake B2. As a result, pressure in the line 164 falls off and the spring behind the dump valve piston moves the dump valve piston to closed position, thus disconnecting its ports from sump. Therefore, actuator 136 for off-going brake B1 cannot immediately discharge to sump until a pressure rise follows the pressure drop. This will of course ensue from filling to brake B2 to near engagement, after which the dump valve will return to its dump position so that brake B1 can be discharged to sump. As will be pointed out later, this characteristic is applied also among other combinations of clutch and brake in the front section.

Another important factor in securing the smoothest possible ratio changes is the accumulator 168. In this case, an accumulator piston 350 is reciprocable in a suitable housing 352, the head end of the piston being charged from the pressure line 164 against the bias of a spring 354. The bore in which the piston 350 reciprocates has three annular grooves 356, 358 and 360. The piston has a reduced annular groove 362 which, in the position of the piston shown in FIG. 8, interconnects the grooves 358 and 360, the former being supplied by pressure from the line 162 and the latter leading to the continuation of the line 164 via a restriction or orifice 364, which affords one of several passage means for controlling the rate of fluid flow. The line 162 itself leads via a second and adjustable passage means or orifice 366 to the groove 356 and thence to a continuation of the line 164. Hence, the rate of fluid flow through the accumulator in this position of the piston is determined by the two passage means 364 and 366. Upon the occurrence of pressure drop in the line 164, as when another actuator is to be filled or charged, the piston 350 moves fully to the left under action of its spring 354 as the accumulator serves its function of supplying additional hydraulic energy beyond that available from the pump 120. When this occurs, the groove 362 now connects the grooves 358 and 356 and a shoulder 368 on the piston blocks flow from groove 358 to groove 360, enabling full flow through the line 164, resulting in complete filling of the engaging actuator. The volume for filling any particular device varies from that required for another because of differences in piston area, piston travel, number of pistons engaging, and conditions of the circuit itself, such as condition of the seals, incidental leaks, etc. By permitting the output of a relatively large pump to flow with minimum restriction, even these variable requirements can be met in an acceptably short time, with a low pressure in the supply system.

When the engaging actuator piston contacts the friction disks, the flow is abruptly stopped, which would normally result in a sudden pressure rise and undesirably rapid torque rise, were it not for the accumulator action in which the first increment of pressure rise causes the accumulator piston to move to the right enough to disconnect grooves 356 and 358, as the head end of the piston (left end) cut offs this communication. At the same time, the shoulder 368 retains the blockade between housing grooves 358 and 360, leaving only orifice 366 as the passage means for controlling the rate of flow to the extension of the line 164. This results in a nearly linear system pressurize at a rate easily controlled by adjusting the size of the orifice. Since the volume required to recharge the accumulator is constant and large relative to leakage volumes or additional volume accepted by the system due to mechanical elasticity, etc., the pressure rise rate is practically unaffected by these variables. Thus, the shift calibration remains acceptable for different shifting modes and condition of mechanical parts. In the present case, when system pressure has reached about 60% of the rated 150 p.s.i., the accumulator piston moves far enough to the right to establish communication again between housing grooves 358 and 360, reestablishing passage means or orifice 364, which now accommodates engaging pressure on the friction device being engaged.

These characteristics of the accumulator occur in other speeds and contribute of course to smooth shifting throughout the several speeds of the transmission.

Continuing with the change in the transmission from second to third, it will be seen that a change is required in four actuators (see FIG. 3), since a change must be made between clutch C1 and clutch C2, as well as between brakes B2 and B1, in changing from second to third.

As the speed selector valve is changed to its third position, long passage 340 therein establishes pilot pressure simultaneously to the three pilot lines 296, 294 and 290, but previously pressurized pilot line 292 is now discharged to reservoir via ports 322 and 310 and central reservoir port 304 in valve 302 of the speed selector valve SSV. Consequently, the piston in valve V3 returns to the left under action of its spring. The pistons in all three valves V1, V2 and V4 are now to the right and foot valve line 174 connects to clutch C2 via ports 176 and 278 in valve V1 and line 280 from port 278 to actuator 130 of clutch C2. At the same time, clutch C1 is discharged to sump via line 290 and ports 288 and 242 in valve V2, thence through line 240 and across valve V1 via ports 238 and 276 to branch line 272 and thence to dump valve port 270. Here again, the pressure drop in line 164 will allow dump valve piston 172 to move to the right, temporarily blocking the discharge to sump, but when the pressure recovers, the piston will again move to the left so that the discharge to sump of clutch C1 can occur. The transmission is now operating with a forward section ratio produced by engagement of brake B1 and clutch C2, the rear section ratio being direct drive because of continued engagement of direct drive clutch C3.

The change to fourth (see table, FIG. 3) requires only a change between clutches B2 and B1, clutch C2 remaining engaged. This is achieved by moving speed selector valve to its number 4 position in which all four pilot lines 296, 294, 292 and 290 are pressurized, meaning that the pistons in all four valves V1, V2, V3 and V4 are to the right. Pilot lines 296 and 294 are pressurized by long passage 340 in speed selector valve SSV. At this time, port 332 connects to port 320 and thence to line 290; port 336 connects via port 322 to line 292. Brake B1 is then dumped to sump via line 252, valve V3 and line 264, because in the rightward position of the piston in valve V3 ports 250 and 262 are connected and line 264 leads to dump valve port 232. Pressure line 164 leads to port 166 in valve V2 and this port, when valve V2 piston is to the right, is connected to valve V2 port 244 which leads via line 246 and branch line 254 to port 256 and then across the valve V3 to line 260. Again, of course, the dump valve and accumulator will perform in the manners previously described.

To the extent described, the transmission relies in the first four speeds forward on engagement of clutch C3, while alternation occurs among the clutch-brake combinations established by C1, C2, B1 and B2. To further carry out the scheme of requiring engagement and disengagement of relatively few actuators between shift changes, the transmission further relies upon engagement of clutch C2 in speeds 3–8 (FIG. 3). This is a result of the establishment in clutch C3 of direct drive to the output, relying upon forward section ratios for the first four speeds.

In fifth speed forward, brake B4 is introduced, which establishes an overdrive in the rear section. As between fifth and sixth speeds forward, brake B4 remains engaged, as does clutch C2, while brakes B1 and B2 are alternated.

In the change from fourth to fifth, there are thus four devices involved, a change from clutch C3 to B4 and a change from brake B2 to B1. This means that clutch C3, as well as brake B2, must be discharged to sump, which occurs as follows when speed selector valve SSV is changed to its fifth position: Pilot line 290 to valve V4 is now no longer pressurized and V4 returns to its leftward position, thus cutting out clutch C3 but cutting in brake B4, clutch C3 discharging to sump via line 222, valve V4 ports 226 and 228 and line 230 to the dump valve DV. Brake B4 is then pressurized from the forward line 210 via valve V4 ports 212 and 234 and line 236. Pilot line 290 leads to reservoir via ports 320 and 306, whereas pilot line 292 leads to reservoir ports 322 and 312. Pilot pressure is applied only to the pistons in valves V1 and V2. Hence, pressure from foot valve line 174 reaches clutch C2 via ports 176 and 278 in valve V1, following line 280; and pressure reaches brake B1 via line 164 and line 252, flowing through connected ports 166 and 244 in valve V2 and connected ports 248 and 250 in valve V3. Brake B2 is discharged through line 260 and V3 ports 258 and 262, reaching dump valve DV via line 264.

The change between fifth and sixth involves only an alternation between brakes B1 and B2 (FIG. 3). When speed selector valve SSV is moved to its sixth position, pilot pressure is applied to valves V1, V2 and V3, since long passage 340 leads via port 316 to pilot line 296 for V1, port 322 leads via 318 to pilot line 294 for V2 and valve V3 is pilot-pressured from line 292 via ports 318 and 322 in speed selector valve SSV. Since valves V1 and V2 were pilot-pressured in fifth speed, there will be no changes in their positions. However, the change in valve V3 results in discharging B1 while pressurizing or charging B2, which follows from the fact that as the piston in V3 shifts to the right, it connects its port 250 to its port 262 while also interconnecting its ports 256 and 258. Hence, pressure line 164 leads again to port 166 in valve V2, out V2 port 244 to V3 port 256 via branch line 254 and thence across valve V3 to port 258 and thence through line 260 to actuator 138 for brake B2. At the same time, B1 is discharging through line 252 to ports 250 and 264 in valve V3 and thence through line 264 to dump valve DV.

In seventh and eighth speeds, the transmission utilizes a fifth speed in the forward section. That is to say, whereas four speed-ratio combinations were obtainable by selective clutch-brake combinations, there is available in seventh and eighth a fifth speed by a clutch-clutch combination; namely, simultaneous engagement of clutches C1 and C2 while brakes B1 and B2 are disengaged. In seventh, clutch C3 is engaged to provide a straight through direct drive in the transmission, while in eighth, clutch C3 is disengaged and brake B4 is engaged to produce an overdrive (FIG. 3). Considering then the four speeds in the front section of the transmission as giving four forward speeds when clutch C3 is engaged while the clutches C1 and C2 are used with brakes B1 and B2, there is now available a fifth forward speed with clutch C3 engaged when both clutches C1 and C2 are engaged. However, in the tabulation of speeds, this fifth speed is actually seventh rather than fifth.

When the speed selector valve is moved to its seventh position, only valves V1 and V4 are pilot-pressured, but the combination of valves V1 and V2 results in simultaneous charging of the actuators for clutches C1 and C2 and of course clutch C3 is charged via the direction valve DSV. Pressure from foot valve line 174 reaches both clutches C1 and C2, which is part of the system which enables disengagement of these clutches by depressing the foot valve pedal 178. In this instance, pressure reaches port 176 of valve V1 and, in the rightward position of its piston, passes through port 282, thence through line 284 to valve V2 via port 286; and thence out through port 288 to clutch C1 via line 290. The positions of valves V2 and V4 in seventh speed are the same as they are in neutral. The disengaging devices in this case will be, as from sixth to seventh speeds, brake B4 and brake B2, the latter discharging to the dump valve via valve V4 (ports 234 and 228 are connected) and the former discharging through valve V3 (ports 258 and 262 are connected).

In the change from seventh to eighth, the speed selector valve is moved upwardly to its final or eighth position, which results in only valve VI being pilot-pressured. Therefore, its piston is the only one that is to the right. Foot valve pressure still enters and flows between the two valves to the clutches C1 and C2 just as it did in seventh speed. The difference is that there is no pilot pressure to valve V4, which means that instead of clutch C3, brake B4 is engaged, producing overdrive of seventh speed forward.

In limiting the use of the transmission to eight forward speeds and four reverse, there are certain interconnections involved in the controls of the two valves SSV and DSV, which will be described later. For present purposes, it will be assumed that the two valves are operated independently but that only the four forward speeds (first through fourth) are used in reverse. These are not exactly the same speed ratios, because of the ratio introduced by the planetary gearing controlled by reverse brake B3. However, as will be seen from the table in FIG. 3, the four reverse speeds involve the four clutch-brake combinations in the front section (C1, C2, B1 and B2) but brake B3 is utilized in place of clutch C3. Reversal of the vehicle is accomplished by changing the position of the direction selector valve from "forward" to "reverse" (R). This merely results in establishing pressure in reverse line 296 rather than in forward line 210. No pilot-operated valve is required in this case, since there is no device to alternate with brake B3 in the four reverse speeds (compare alternation between C3 and B4 in fourth and fifth, sixth and seventh and seventh and eighth forward). Hence, although valve V4 is supplied with pilot pressure line 290 in the four reverse speeds, it has no effect on clutch C3 or brake B4 since there is no actuator pressure available, the actuator pressure having been diverted directly to brake B3. Consequently, the first four positions in first, second, third and fourth will correspond to the four reverse positions, and the control of the pilot-operated valves V1, V2 and V3 will accordingly be the same in reverse as in forward.

The connection of the foot valve pressure line 174 upstream of the actuator 168 means that accumulator pressure is not applied to the line 174. This has been resorted to because it results in more capacity in "inching" the tractor with the clutch or foot pedal 178. Moreover, the already pointed out, clutches C1 and C2 are always pressurized from line 174 and never from line 164.

The foregoing description of the control of the transmission and the various ratios supplied and in the order named are based on experience with the performance of agricultural and industrial tractors at required fixed ground speeds. For example, there are six basic speeds that have proven to be desirable for agricultural tractors; namely (in m.p.h.) 1½ and 2½ for power shaft work, 3½ and 4½ for tillage work, 7 to 8 for mowing and haying operations and a high transport speed of around 20. At least one reverse speed of approximately 3.5 m.p.h. is also required. It has also been found that in order to obtain smooth shifting and still have sufficient speed change to increase the drawbar pull enough to lug through the tough spots, a 25% reduction in speeds between steps is most desirable, 18% reduction is too small to produce the desired increase in drawbar pull and any step appreciably above 30% causes rough shifting. Combined with slight variations in engine speed, the above are achieved in the present transmission, in connection with which there are set forth, by way of example, and at low full load engine speed of 1500 r.p.m. to eight forward speeds: 1.17, 1.66, 2.58, 3.34, 4.30, 5.57, 7.38 and 12.30. The reverse speeds are in m.p.h. 1.3, 1.94, 3.01 and 3.90. These will be considerably higher at maximum engine speed for transport (for example, 2500 r.p.m.), in which forward will be 1.95 and eighth will be 20.50.

The importance of the minimum number of clutches and brakes engaging and disengaging at the same time has been touched on above. A review of this phase of the invention will show that there are never more than four on-coming or off-going units or elements, and in many cases there are only two. For example, as between second and third, four elements are involved (B2–B1 and C1–C2) while between first and second the alternation is simply between B1 and B2. Only two are involved between third and fourth whereas four are involved between fourth and fifth, but between fifth and sixth, only two are alternated. Between sixth and seventh, four units are involved, but between seventh and eighth there is only alternation between two, C3 and B4.

Another characteristic of the transmission is that as between the four forward speeds and the four reverse speeds, alternation between forward and reverse, sometimes called "shuttling" is easily obtainable by use of the direction selector valve. For example, with the speed selector valve in any one of first, second, third or fourth, the direction selector valve can be alternated between first and reverse to alternate between clutches C3 and B3. The first four speeds in any event are direct in the rear planetary section in forward and the alternation occurs in the front section. Fifth and sixth are overdrive in the rear section and alternation in the fourth section. Seventh and eighth are direct in the front section and alternated in the rear section. Fifth is an overdrive of third, sixth is an overdrive of fourth and eighth is an overdrive of seventh.

Although there are four friction devices in the front section (C1, C2, B1 and B2) there are only the three pilot-operated valves V1, V2 and V3. By adding two more friction devices (C3 and B4) to the rear section, only one more pilot-operated valve (V4) is required. This considerably reduces the number of valves over a system which would normally require one valve for each unit. The simple sliding valve member 302 in the speed selector valve SSV enables the use with this valve, as well as with the direction selector valve DSV, of a simplified and convenient form of control, which will be described next.

In connection with the schematic illustration of the hydraulic circuit (FIG. 7), the speed selector valve and direction selector valve were discussed on the basis of a temporary assumption that both valves would be in separate housings. However, in a commercial embodiment, the two valves are of course in the same housing, an example of which is shown in the lower left-hand portion of FIG. 9. Nevertheless, the two numerals 184 and 298 are used for purposes of orientation, it being understood that the previously described two housings constitute in effect a basic support for the speed selector valve member 302 and the direction selector valve member 196. In this particular embodiment of the invention, the bores for the two valve members are parallel or side by side, here on a somewhat upwardly and forwardly inclined axis; although, this is patentably immaterial so far as concerns direction of movement in particular. This is also true of other dispositions of coordinated control elements and therefore such expressions as "fore-and-aft," "upper" etc., are used as terms of convenience and not of limitation.

Figure 9:
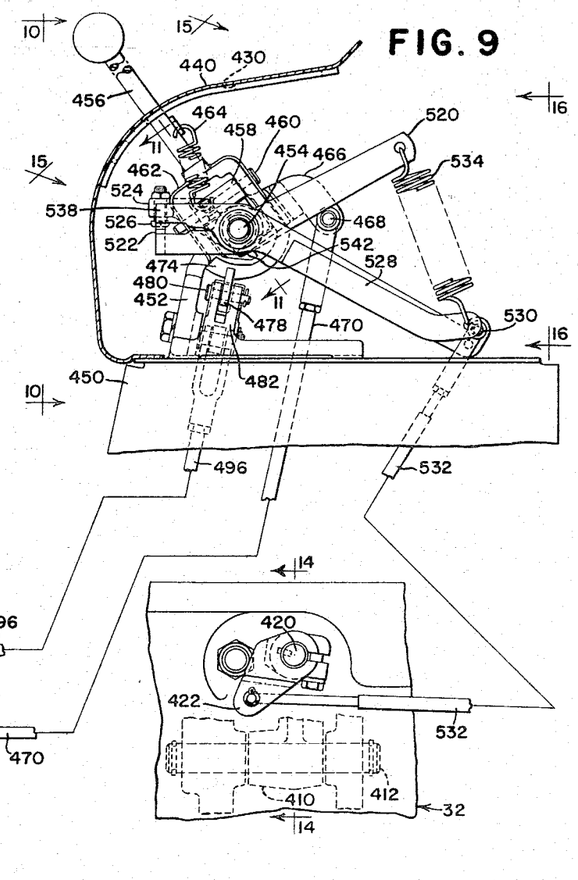
FIG. 9 is a longitudinal composite sectional view of the shifter controls and the elements immediately controlled thereby.

As will be seen clearly in the portion of FIG. 9 referred to, the basic support or housing has a forward portion which carries a pair of transverse pivot shafts 382 and 384, the axes of which are parallel but which are transverse to the generally fore-and-aft axes or lines of movement of the valve members 302 and 196. The shaft 382 has pinned or otherwise secured thereto an arm 386 which extends upwardly to a pivotal connection 388 to a valve rod 390 which in turn is connected to the spool or valve member 196 of the direction selector valve DSV. The arm 386 is thus rockable among three positions; namely, a forward position and a reverse position at opposite sides of an intermediate or neutral position. These positions are identified in the figure by the letters F, N and R. In FIG. 9, the direction selector valve occupies its neutral status or position. The shaft 382 extends externally of the support or housing 380 and has affixed thereto an operating arm 392, which is controlled by means to be presently described.

The second rockshaft 384 has affixed thereto an upstanding arm 394 which has at its upper end a pivotal connection 396 to a valve rod 398 which is in turn connected to the slidable valve member 302 for the speed selector valve SSV. The arm, and accordingly the speed selector valve, is movable among several positions. At one end of the range of movement is a park position, next is a neutral position and next is a speed range of sequentially increasing speeds. In the drawing, an arcuate row of letters and numerals indicates these at P–N–1–2–3–4–5–6–7–8. As shown, the arm 394, and consequently the speed selector valve, is in its fourth speed position. The rockshaft 384 is connected externally of the support or housing 380 to an operating arm 400, which, like the arm 392, is controlled by control mechanism to be subsequently described.

The direction selector valve arm 386 has a rearwardly extending nose or portion 402, the fore-and-aft upper arcuate edge of which is an arc about the axis of the other rockshaft 384. The speed selector valve arm 394 has a rearwardly and laterally inwardly directed lug or portion 404, which lies just above the arcuate edge on the nose 402. In the positions of the parts as shown in FIG. 9, the disposition of the lug 404 on the speed selector valve arm is such that the direction selector valve arm may be readily moved among its F, N and R positions. Likewise, the relative dispositions of the nose and lug are such that the speed selector valve arm may be rocked among its ten positions. Now, in order to limit the use of reverse speeds, the nose and lug are so designed as to provide an interlock. In the present case, it is desired to prevent use of the transmission in reverse at speeds above fourth. Thus, if the speed selector valve arm 394 is moved to its fifth speed position, while the direction selector valve arm 386 is in neutral, the lug 404 will move one increment to the right and thus will lie directly above the arcuate upper edge on the nose 402. Consequently, the direction selector valve arm 386 cannot be rocked in a clockwise direction (to its reverse position); although it can freely be rocked between its forward and neutral positions. In short, when the speed selector valve arm 394 is in any position from fifth through eighth, the direction selector valve arm 386 cannot be rocked to reverse. This effectively prevents use of speeds higher than fourth in reverse. Other selections could be made but the basic point is that the interlock is established between the speed selector valve arm and direction selector valve arm.

A further characteristic of the interlock is this: If, with the speed selector valve arm 394 in fourth or below (except in park position), the direction selector valve arm 386 is moved to its reverse position, the spool 196 will move outwardly or forwardly. If the speed selector valve arm is now moved in a counterclockwise direction to its neutral position, the lug 404 will just about contact the front edge of the direction selector valve spool 196. Further counterclockwise movement of the speed selector valve arm to its park position will cause the lug 404 to contact the front edge of the spool 196 and will therefore force the spool back to its neutral position. This means that when the transmission is in its park condition it cannot simultaneously be in reverse. Likewise, as long as the speed selector valve arm 394 is in its park position, the direction selector valve spool cannot be moved out of its neutral position. This assures that the tractor operator will not inadvertently start the tractor in reverse as he shifts out of park position.

The interlock has a still further function. With the speed selector valve arm in any position from neutral to fourth, the direction selector valve arm can be moved to its reverse position. However, as it does so, the rear arcuate edge of the nose 402 moves upwardly and forwardly and in blocking relation to the inner forward edge of the lug 404. This means that the speed selector valve cannot now be moved to a position higher than fourth. Therefore, the interlock between the two arms is complete for the purposes intended.

On the basis of a brief description of what is involved, the two valve members 196 and 302 comprise lower and upper selectively shiftable members and the two arms 386 and 394 comprise operators having interlocking portions, such as 402 and 404, for blocking out certain phases of the coordinated movement of the two, in this specific example the two rockshafts 382 and 384 comprising upper and lower transverse pivots.

Of course, in the commercial embodiment of the transmission, the housing 380 and its related parts will be internally of the vehicle along with the transmission components.

Figure 14:
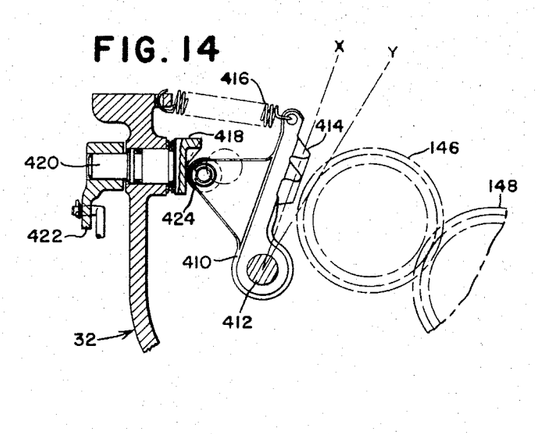
FIG. 14 is a section on the line 14—14 of FIG. 9.

In addition to the two elements—speed selector valve and direction selector valve—as constituting controllable parts of the transmission, there is a third element; namely, a parking lock, the basic structure of which is best shown in FIGS. 9 and 14. The lock in this case preferably comprises a parking lock member or pawl 410 pivotally mounted on a fore-and-aft axis by means of a shaft 412, which is suitably carried in any part of the transmission housing 32. The pawl has a toothed portion 414 normally biased by a spring 416 to a release or unlocked position relative to the output shaft gear 146. The dot-dash line X through the toothed portion 414, together with the other dot-dash line Y, represents the difference between the two positions, the line Y of course showing the locked position in which the toothed portion 414 engages the teeth of the gear 146. In this case, the gear is of the helical type, which accounts for the shape of the toothed portion 414.

Movement of the pawl 410 from its release or unlocked position (position X) to its locked or park position (position Y) is effected by a cam 418 secured to a short transverse rockshaft 420 which extends externally of the housing 32, having affixed thereto an external operating arm 422. When the cam occupies the position shown in FIGS. 9 and 14, a follower 424 on the pawl 410 occupies a low portion on the cam. When the cam is turned in a counterclockwise direction, the high portion of the cam, engaging the follower 424, forces the pawl to position Y—its locked or parked position. When the arm 422 and rockshaft 420 are then turned oppositely, the spring 416 will retract the pawl 410.

It is a feature of the invention that the three controllable transmission elements, namely, the speed selector valve SSV, the direction selector valve DSV and the parking lock or pawl 410, be controlled by, in one form of the invention, a single control lever movable in a convenient shift pattern, with provisions made for modification of the control by the addition thereto of a second lever for controlling the direction selector valve in the cases of certain types of tractors. The single-lever control will be described first, in connection with a shift pattern best shown in FIG. 15.

As seen in that figure, the shift pattern is primarily J-shaped, the upper portion thereof being in the form of a J and further having a lower or tail portion of smaller L-shaped configuration. The basic part of the J has an elongated fore-and-aft slot or guide 430, a shorter slot or guide 432 and a transverse bottom or bight portion 434, from an intermediate portion of which the tail part of the slot depends, this tail part having a short fore-and-aft leg 436 and a transverse lower part 438. This configuration is formed in a sheet of steel or other suitable metal such as designated generally by the numeral 440, the whole forming part of or overlying supporting structure on which the control mechanism is mounted, to be described below. Having reference still to FIG. 15, it will be noted therein that the figure bears the identification of the several positions of the shift lever, as indicated by the numerals 1–8, as well as by the legend "forward" along the long slot 430 and "reverse" along the short slot 432. In addition, the letter "N" is used twice, once at the bottom of each of the reverse and forward ranges, as well as the legend "park" at the short or offset portion 438 of the tail part of the slot. In the commercial embodiment, this portion of the panel will of course be readily visible to the operator, the panel occupying the typical position of an instrument panel or console on the vehicle; that is, just ahead of the steering wheel and within ready access to the operator.

Figure 11:
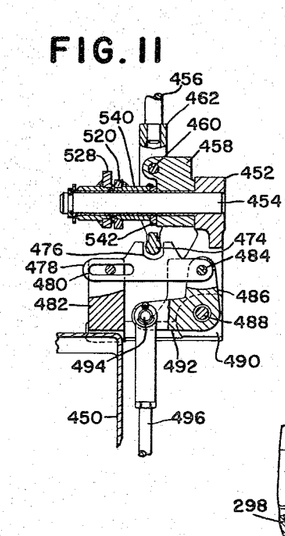
FIG. 11 is a section on the line 11—11 of FIG. 9.
Figure 12:
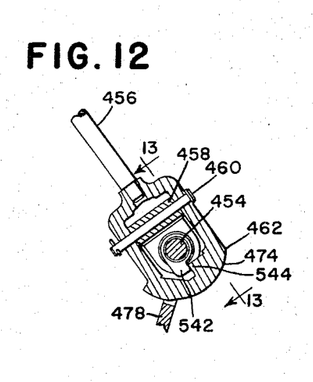
FIG. 12 is a section on the line 12—12 of FIG. 10.

The console or other supporting part of the tractor, of which the panel 440 forms a part, is designated generally by the numeral 450, and includes a bracket or equivalent support 452 which supports a fixed pivot shaft 454 to establish a transverse pivot axis for the mounting of a control lever unit comprising a lever 456 and a lever-mounting member 458. The arrangement is such that the lever 456 projects outwardly through and is guided by the pattern (FIG. 15), the lever being in this case somewhat in the nature of a radius as respects the transverse axis of the pivot shaft 454. The mounting member 458 is a block loose on the shaft 454 and therefore freely rockable about the axis of the shaft. The connection between the lever 456 and the block 458 is established by a pin 460 which lies in a longitudinal or fore-and-aft plane; at least, a plane that intersects the axis of the shaft 454 at a right angle. For present purposes, the axis of the pivot pin 460 may be considered fore-and-aft, even though it inclines somewhat upwardly and forwardly, depending upon the position of the lever 456 relative to the front and rear limits established by the shift pattern. The lower end of the lever has a box-like portion 462 which closely embraces the mounting block 458 (FIG. 12). Because of this configuration, the lever and block are interconnected for fore-and-aft rocking of the block about the shaft 452; yet, the lever itself is rockable laterally about the pivot pin 460. This will best be appreciated by consideration thereof in conjunction with the shift pattern of FIG. 15. The lever 456 there is shown in its central or neutral position, as is true also of FIGS. 10, 11 and 12. This lever may be shifted laterally to either of two positions, to the left to its reverse position or to the right to its forward position. When, for example, it is shifted to its forward position, it is then in a speed position for attaining the eight forward speeds. When shifted to the left, to the reverse speed position, it is capable of being shifted through four reverse speeds, the upper end of the slot 432 establishing a limit on the shiftability of the lever. This is in addition to the interlock established between the speed selector valve and direction selector valve in the valve housing 380, described above.

From its central position, the lever 456 may be shifted downwardly into the fore-and-aft portion of the tail slot, which places the speed selector valve in its park position, as well as conditioning the park pawl 410 for engagement with the output gear 146. Because of the pivot pin 460, the lever 456 may be shifted laterally to the right, into the transverse portion of the tail slot, thereby retaining the park position. For this purpose, the block 458 and lever 456 are interconnected by a small tension spring 464 which biases the lever to the right. Bearing in mind the arrangement of the valve control mechanism in the lower left-hand portion of FIG. 9, it will be seen that leftward shifting of the lever 456 in the portion 438 of the tail part of the slot leaves the transmission in park, and it requires a further forward shifting thereof to the position of FIG. 15 before the park lock is released. As previously described, this assures that the transmission is in neutral, so that it cannot be inadvertently started in reverse. From the central position of FIG. 15, the operator may select either the forward range or the reverse range. As already noted, the operator has available to him eight forward speeds but only four reverse speeds, since, as already explained, these particular speeds have proven sufficient for vehicles of this type.

Integral with the mounting member or block 458 is a forwardly and downwardly curved arm 466 which is connected by a pivot pin 468 to a link 470 which extends downwardly and rearwardly and which is connected by a pivot pin 472 to the previously described speed selector valve arm 400. Hence, rocking of the mounting member or block 458 about the axis of the shaft 454 will effect shifting of the speed selector valve SSV among its several positions, including neutral through eighth when in the forward range, neutral through fourth when in the reverse range and between neutral and park when in its center position.

The lower part of the box-like portion 462 to which the lever 456 is rigidly connected is in the form of an arc or track 474 which runs in a notch or slot 476 in a laterally shiftable member 478. As best seen in FIG. 11, one end of the member 478 is carried by a pin and slot connection 480 on a portion 482 of the bracket 452, and is pivotally connected at its other end by a pivot pin 484 to one arm 486 of a bell crank that is pivoted at 488 on another portion 490 of the bracket 452. The other arm 492 of the bell crank is connected by a pivot pin 492 to the upper end of a link 496, the lower end of which is connected by a pivot pin 498 to the previously descirbed direction selector valve arm 392.

It will thus be seen that rocking of the lever 456 about the pivot 460, when the lever is in the cross portion 434 of the shift pattern (FIG. 15) will shift the member 478 among its forward, neutral and reverse positions, thereby rocking the bell crank 486–492 to effect changes in position of the direction selector valve DSV. It will be clear of course that lateral rocking of the lever 456 has no effect on the angular position of the mounting block 458. Hence, the position of the speed selector valve is not changed. Conversely, so long as the lever 456 is in one or the other of the fore-and-aft tracks 430 or 432, it cannot be rocked laterally and therefore as the speed selector valve is moved among its several positions (first through eighth) the position of the direction selector valve cannot change. In short, it is only when the lever 456 is in the cross portion of the "J" that selection may be made among forward, reverse or park.

Figure 17:
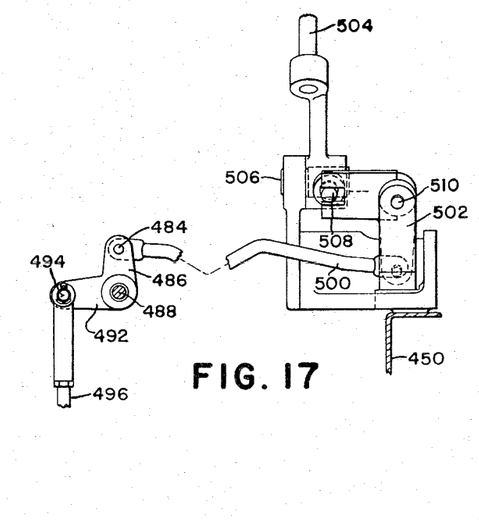
FIG. 17 is a front elevation showing a modified form of control.

FIGURE 17 shows a modified form of arrangement in which the bell crank 486–492, instead of being connected directly to the lever 456, is connected by a link 500 to a bell crank 502 of a different form of lever construction, that shown comprising a second lever 504 mounted independently of the lever 456 and rockable about a cross shaft 506 so as to transfer movement via a lever-carried pin 508 to a slotted arm of the bell crank. The bell crank is pivoted at 510 on other portions of the support 450. In a tractor having controls of this type, the "J" pattern is replaced by a single slot corresponding to the long leg 430 of the pattern of FIG. 15, plus the L-shaped portion affording a park position. Controls of this type will be used on tractors of the so-called industrial type, wherein a forward speed is selected and then a second lever is used to "shuttle" back and forth between forward and reverse while the speed selector valve is in the same position. In that case, as in the agricultural tractor, the interlock will be present (lower left-hand portion of FIG. 9) so that only the four speeds may be used in reverse. This interlock will also require that the lever 504 be returned to neutral or forward before speeds higher than fourth can be obtained in a forward direction.

The park lock is controlled by the lever 456 through the medium of intervening arms and levers to be described at this time. Loose on the transverse shaft 454 is an arm 520 which has a portion to the rear of the shaft 454 bent inwardly or laterally to afford an abutment 522. A rearwardly extending arm 524, integral with the mounting block 458, carries an adjustable abutment screw 526 which is engageable at times with the abutment 522 on the park lock arm 520. Looking now at FIGS. 9 and 10, it will be seen that the lever 456, occupying its neutral position, conditions the abutment 526 to a point just short of engagement with the arm abutment 522. Consequently, rearward movement of the lever 456 (FIG. 9) rocks the mounting block 458 so that the abutment screw 526 contacts the arm abutment 522, thereby rocking the arm 520 in a counterclockwise direction. This occurs of course as the lever is moved from its neutral to its park position. Since the relationship between the abutments 522 and 526 is effective in only one direction (counterclockwise) it follows that forward movement of the level 456 among the several speed positions has no positive effect on the park arm 520. Hence, this connection is a one-way lost-motion connection.

Also loose on the pivot shaft 454 is a second park lock arm 528, the free end of which is connected at 530 to a link 532 which in turn is connected to the park lock outer arm 422 (FIG. 9). A force-transmitting connection is established between the two park arms 520 and 528 by a yieldable means, here in the form of a tension spring 534. In the positions of the parts as shown in FIGS. 9 and 14, the park pawl spring 416 has sufficient force to keep the park pawl in its released position (position X), and whatever force is transmitted by the spring 534 is not sufficient to change this condition. However, when the control lever 456 is rocked rearwardly to its park position, causing engagement at the abutment means 526–522, a counterclockwise motion is imparted to the upper park arm 520. This tensions the spring 534 and exerts on the arm 528 a force sufficient to overcome the force exerted by the park pawl spring 416. If the alinement of the teeth on the output shaft gear 146 relative to the toothed portion 414 of the park pawl is such that the teeth will not mesh, the park pawl of course stops short of mesh, but the force exerted by the spring 534, acting through the linkage 532, loads the park pawl so that upon slight turning of the output shaft gear 146, the locking condition is achieved and the force just described is sufficient to maintain this parked condition.

Figure 10:
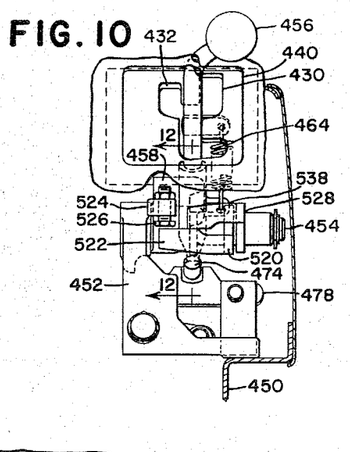
FIG. 10 is a rear view of FIG. 9 as seen on the line 10—10.

When the lever 456 is moved forwardly from its park position to its neutral position, the one-way connection (abutment means 522–526) cannot return the arm 520 downwardly and, consequently the arm 520 cannot return the other arm 528. Thus, the spring 416, acting on the park pawl 410, would be ineffective to return the park pawl to its released position when binding between the teeth on the gear 146 and those on the park pawl is excessive. Therefore, it is desired to transmit a positive releasing force to the park pawl rockshaft 420. This is accomplished by providing the arm 528 with a rear lug 536 which overlies the lug 522 on the arm 520 (FIGS. 9 and 10).

Figure 13:
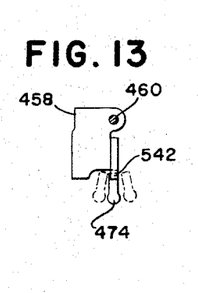
FIG. 13 is a section, partly schematic, on the line 13—13 of FIG. 12.
Figure 15:
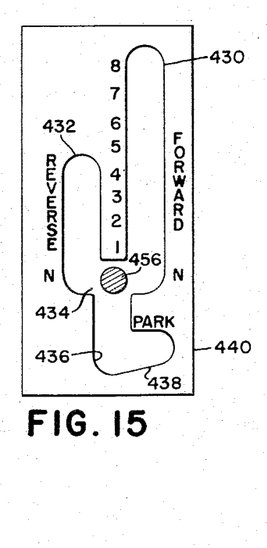
FIG. 15 is a plan of the shift pattern as seen on the line 15—15 of FIG. 9.
Figure 16:
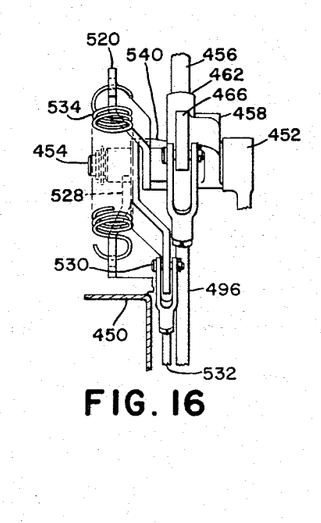
FIG. 16 is a fragmentary front view as seen on the line 16—16 of FIG. 9.

As best seen in FIG. 11, the park arm 520 is rigidly secured to a sleeve 540 which in turn has rigidly secured thereto at its inner end a depending lug 542 (see also FIG. 12). The interior of the box-like portion 462 at the lower end of the lever 456 is provided with a one-way lug 544 (FIG. 12) which is engageable with the park arm lug 542 when the lever 456 is in its central position. In this case, this occurs only when the lever 456 is alined with the fore-and-aft portion 436 of the L-shaped or tail slot in the shift pattern (FIG. 15). Further, the lugs 542 and 544 are operatively engageable only when the lever 456 is moved forwardly from "park" to neutral; that is, the neutral position at the center of the transverse slot portion 434 of the J. Whenever the lever 456 is rocked to either side, the lug 544 becomes misalined with the lug 542 (broken lines in FIG. 13, which shows the respective positions of the track 474 when the lever 456 is traveling in either one of the slots 430 (forward) or 432 (reverse)). Consequently, since the lugs 542 and 544 become disengaged in this condition, fore-and-aft rocking of the lever 456 in either of the forward or reverse speed ranges does not require a concomitant rocking of the park arm 520. Nevertheless, when the two lugs are engaged, as when the lever 456 is moving from its park to its neutral position, it establishes a one-way force-transmitting connection operative to exert a counterclockwise force on the arm 520 which in turn acts through the now engaged lugs 522 and 538 to rock the other arm 528 also clockwise, exerting a downward force on the park lock link 532.

In summary of the control mechanism, it should be observed that there are three controllable transmission parts; namely, the speed selector valve SSV, the direction selector valve DSV, and the park lock pawl 410. The two valves are independently controlled, with appropriate interlocks provided, not only in the housing 380, but also in the shift pattern (FIG. 15) to assure that the valves are moved independently of each other although in a related manner. The park lock is controlled in such manner that it cannot be engaged while the transmission is in a speed condition, nor can the transmission be placed in a speed condition until the control lever is first moved to take the transmission out of its parked condition.

Features of the invention in its entirety, other than those categorically enumerated, will readily occur to those versed in the art, as will many modifications and alterations in the preferred embodiment disclosed, all of which may be achieved without departure from the spirit and scope of the invention.

What is claimed is.

1. A transmission, comprising: a drive shaft; a first planetary unit including first and second, coaxial relatively rotatable sun gears, first and second relatively rotatable ring gears respectively surrounding the first and second sun gears, a rotatable planet carrier journaling first and second coaxially connected planet gears meshing respectively with the first and second sun and ring gears, first and second clutches for selectively coupling either or both of the sun gears to the drive shaft, and first and second brake means for selectively and alternately braking and releasing the ring gears whereby said carrier serves as a first unit output element rotatable at four different forward reduction ratios when the sun gears are alternately coupled to the drive shaft and the ring gears are alternately braked and released and rotatable at a forward direct ratio when both sun gears are coupled to said drive shaft and both ring gears are released; a second coaxial planetary unit including said carrier as an input element, third and fourth relatively rotatable sun gears, a third ring gear surrounding said third sun gear, a third planet gear on the carrier and meshing with the third sun and third ring gears, a fourth planet gear on the carrier and meshing with the third planet and fourth sun gears, third brake means for selectively braking and releasing the third ring gear, third clutch means for selectively coupling the third and fourth sun gears together, and fourth brake means for selectively braking and releasing the third sun gear whereby said fourth sun gear rotates as a second unit output driven from said carrier at a forward direct ratio when the third and fourth sun gears are coupled while the third and fourth brake means are released, at a forward overdrive ratio when the third sun gear is braked and the third ring gear is released, and at a reverse reduction ratio when the third ring gear is braked while the third and fourth sun gears are uncoupled and the fourth brake means is released.

2. The invention defined in claim 1, in which: the second unit is coaxially behind the first unit and the fourth sun gear is located ahead of the third sun gear and rearwardly of the first and second sun gears, the third sun gear is axially hollow, an output shaft is coaxially connected to said fourth sun gear and extends rearwardly through said third sun gear, and the fourth brake means includes a hollow shaft coaxially surrounding said output shaft and coaxially connected to said third sun gear.

3. The invention defined in claim 1, in which: the drive shaft, and the first and second planetary units are coaxial on a fore-and-aft axis in the order named, the first sun gear is axially hollow and the second sun gear is closely spaced rearwardly of said first sun gear, the first and second clutch means are intermediate said drive shaft and said first and second sun gears, said first clutch means includes a hollow driven shaft coaxially connected to the first sun gear, said second clutch means is ahead of said first clutch means and includes a driven shaft extending loosely through said hollow shaft and first sun gear and is coaxially connected to said second gear.

4. The invention defined in claim 3, in which: the third sun gear is axially hollow and is spaced rearwardly from the second sun gear, the fourth brake means includes a hollow intermediate shaft coaxially connected to and extending rearwardly from said third sun gear, and said fourth sun gear is coaxially between the second and third sun gears and includes a coaxially connected output shaft extending rearwardly through said hollow intermediate shaft.

5. The invention defined in claim 3, including: a power take-off clutch coaxially intermediate the first clutch means and the second sun gear and includes a hollow power shaft coaxially surrounding the hollow driven shaft and extending rearwardly toward but short of said second sun gear, and a power take-off drive gear connected to said hollow power shaft.

6. A transmission, comprising: a drive shaft; a first planetary unit including first and second, coaxial, relatively rotatable driven gears, first and second relatively rotatable reaction gears respectively concentric with the first and second driven gears, a rotatable planet carrier journaling first and second coaxially connected planet gears meshing respectively with the first and second driven and reaction gears, first and second clutches for selectively coupling either or both of the driven gears to the drive shaft, and first and second brake means for selectively and alternately braking and releasing the reaction gears whereby said carrier serves as a first unit output element rotatable at four different forward reduction ratios when the driven gears are alternately coupled to the drive shaft and the reaction gears are alternately braked and released and rotatable at a forward direct ratio when both driven gears are coupled to said drive shaft and both reaction gears are released; a second coaxial planetary unit including said carrier as an input element, third and fourth relatively rotatable driven gears, a third reaction gear concentric with said third driven gear, a third planet gear on the carrier and meshing with the third driven and third reaction gears, a fourth planet gear on the carrier and meshing with the third planet and fourth driven gears, third brake means for selectively braking and releasing the third reaction gear, third clutch means for selectively coupling the third and fourth driven gears together, and fourth brake means for selectively braking and releasing the third driven gear whereby said fourth driven gear rotates as a second unit output driven from said carrier at a forward direct ratio when the third and fourth driven gears are coupled while the third and fourth brake means are released, at a forward overdrive ratio when the third driven gear is braked and the third reaction gear is released, and at a reverse reduction ratio when the third reaction gear is braked while the third and fourth driven gears are uncoupled and the fourth brake means is released.

7. A transmission, comprising: a drive shaft; first and second planetary gear sets arranged in series and including a common carrier; means for selectively driving the carrier from the drive shaft at any one of four forward speeds whereby the carrier serves as the input for the second gear set; an output shaft directly connected to the sun gear of the second planetary gear set; and means for selectively driving the output shaft sun gear from the carrier at any one of two forward speeds and one reverse speed.

8. A transmission, comprising: a drive shaft; first and second planetary gear sets arranged in series and including a common carrier; means for selectively driving the carrier from the drive shaft at any one of five forward speeds whereby the carrier serves as the input for the second gear set; an output shaft directly connected to the sun gear of the second planetary gear set; and means for selectively driving the output shaft sun gear from the carrier at any one of two forward speeds and one reverse speed.

9. A planetary transmission, comprising: a single carrier rotatable on a fore-and-aft axis and having spaced apart, centrally apertured front and rear walls and means rigidly interconnecting said walls and having openings therein exposing the interior of said carrier radially outwardly; a first centrally apertured sun gear within the carrier just behind the front wall; a second, separate sun gear within the carrier just rearwardly of said first sun gear; first and second relatively rotatable ring gears encircling the carrier and respectively concentric with the first and second sun gears; first and second coaxially connected planet gears meshing respectively with said first and second sun gears and meshing respectively with said first and second ring gears via at least one of the aforesaid openings; a centrally apertured third sun gear separate from the others and disposed within the carrier ahead of said rear wall and spaced rearwardly from said second sun gear; a fourth sun gear separate from the others and disposed within the carrier intermediate the second and third sun gears, a third rotatable ring gear encircling the carrier in concentric relation to the third sun gear, a third planet gear meshing with the third sun gear and in mesh with the third ring gear via an aforesaid opening, a fourth planet gear meshing with the third planet gear and the fourth sun gear; a hollow input shaft extending coaxially through the carrier front wall and fixed to the first sun gear; a second input shaft extending coaxially through the hollow shaft and first sun gear and fixed to the second sun gear; a hollow intermediate shaft extending coaxially through the carrier rear wall and fixed to the third sun gear; and an output shaft extending axially through the intermediate shaft and fixed to the fourth sun gear.

References Cited by the Examiner

UNITED STATES PATENTS

| | | | |
|---|---|---|---|
| 707,672 | 8/1902 | Baker | 74—768 |
| 1,365,195 | 1/1921 | Reeve | 74—763 |
| 1,418,537 | 6/1922 | Cotal | 74—767 |
| 1,636,800 | 7/1927 | Blood | 74—763 |
| 1,883,500 | 10/1932 | Bjorndal | 74—763 |
| 2,697,368 | 12/1954 | Winther et al. | 74—769 |
| 2,756,600 | 7/1956 | Kamlukin et al. | 74—760 |
| 2,890,603 | 6/1959 | Harris et al. | 74—760 |
| 2,902,888 | 9/1959 | Powischill et al. | 74—761 |

FOREIGN PATENTS

| | | |
|---|---|---|
| 272,532 | 11/1927 | Great Britain. |

DAVID J. WILLIAMOWSKY, *Primary Examiner.*

THOMAS C. PERRY, *Examiner.*